United States Patent Office

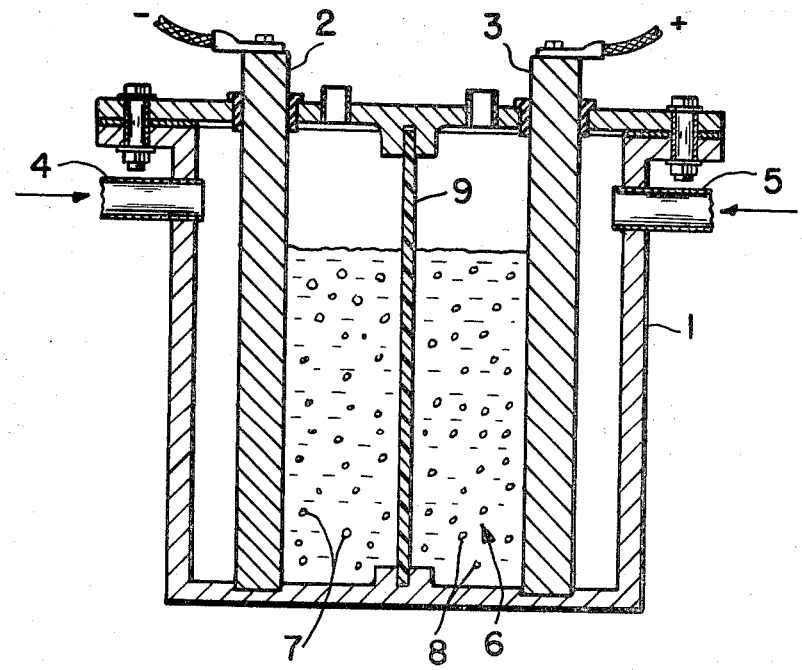

3,563,802
Patented Feb. 16, 1971

3,563,802
FUEL CELL CONSTRUCTION
Rupert L. Ogden, Williamsville, N.Y., assignor to The Carborundum Company, Niagara Falls, N.Y., a corporation of Delaware
Filed Oct. 3, 1968, Ser. No. 764,730
Int. Cl. H01m 27/00
U.S. Cl. 136—86                                      5 Claims

ABSTRACT OF THE DISCLOSURE

This invention pertains to a fuel cell which comprises a case with porous positive and negative electrodes inserted therein dividing the interior of the case into three sections. Electrolyte fills the inner section or space. Means for introducing an oxidizing gas into the space behind one porous electrode and a fuel behind the other are provided. The inner section is divided by a porous membrane substantially parallel to the electrodes comprising synthetic fibers prepared from resin condensation products of phenols and aldehydes which can be fiberized and cured. This membrane permits communication of electrolyte between electrodes but prevents passage of small bubbles of oxidizing or fuel gases.

BACKGROUND OF THE INVENTION

Fuel cells make a direct conversion of chemical energy to electrical energy. They consist of a vessel containing electrolyte and two electrodes. The basic process within the cell is the oxidation of the fuel. Fuel is supplied to one electrode and the oxidant, air or oxygen, to the other. The electrolyte separates the fuel and oxygen thus substantially preventing direct reaction (combustion) between them. The reaction is achieved by the migration of oxygen bearing ions across the electrolyte to the fuel electrode. On reaching the fuel electrode, these ions give up their electrons to the fuel electrode, which gives it a negative charge. At the oxygen or air electrode, negative ions are formed by the oxygen taking up electrons, thus giving the electrode a positive charge.

The electrodes must be good conductors and have a large surface area since they provide the interface between fuel or air and electrolyte where the reactions take place. Also, they must be good catalysts of these reactions. The electrodes must, of course, be resistant to chemical reaction with the electrolyte. The least reactive of metals are the precious metals, particularly in the platinum group, which are neither attacked by weak acids nor by alkalies. They are good catalysts at low temperatures. Their disadvantage is a high cost. A number of metals are resistant to alkalies, but are poorer catalysts than platinum metals. At higher temperatures, above 150° C. where less active catalysts can stimulate the reaction of a cell, nickel can be used. Carbon electrodes are also used.

The electrolyte used in fuel cells must have a high conductivity and must contain oxygen bearing ions. Examples are dilute sulfuric acid, containing the ion $SO_4^{--}$, alkaline metal hydroxides, containing $OH^-$ ions, carbonates which contain the ion $CO_3^{--}$ and phosphate which contains the $PO_4^{---}$ ion. The electrolyte must not attack the electrode material or react with the fuel or the products of its oxidation. Furthermore, it must not react with the vessel or container.

A number of fuels may be used in fuel cells. Hydrogen has been used successfully with oxygen as an oxidizer. Less expensive organic fuels such as methane or butane, kerosene or diesel fuel are of more interest. Organic fuels, however, are not electrochemically active, whereas hydrogen is. For example, hydrocarbon fuels are not reactive even in the presence of extremely active catalysts at temperatures below 150° C. At higher temperatures, less active catalysts are needed. Higher temperature cells, of course, cannot use electrolytes in aqueous solution.

Fuel cells are low voltage, high current systems. Individual cells have output voltages between 0.5 and 1.5 volts and can operate at current densities of 200 to 300 amps per square foot. To get any useful power, therefore, many cells must be connected in series. Therefore, it is desirable to construct individual cells so that they are as narrow as possible. In other words, it is desirable to have the electrodes relatively close together with the minimum of electrolyte therebetween. While theoretically the oxidizing and reducing gases introduced through the porous electrodes are to react on the surface of the electrodes, small bubbles of these gases escape into the electrolyte. It is imperative that these bubbles do not meet as they will react and the resulting heat of combustion will cause hot spots that damage the cell.

It is an object of this invention to provide a fuel cell construction in which the electrodes can be placed relatively close together and wherein there is no danger of bubbles of oxidizing and fuel gases meeting. It is a further object of the invention to provide a fuel cell construction in which the inner space containing the electrolyte is separated by a porous membrane which is relatively inert to the aqueous electrolyte at operating temperatures and which is easily wet by the electrolyte thereby providing an effective barrier to bubbles.

THE INVENTION

According to this invention, there is provided a fuel cell construction wherein a membrane of synthetic fiber divides the space between the electrodes. The membrane is comprised of synthetic fibers that are resin condensation products of phenols and aldehydes which can be fiberized and cured. Hereafter, the synthetic fibers are referred to as phenolic fibers. According to one aspect of this invention, the membrane is a paper prepared from phenolic fibers. According to another mode of practicing this invention, the membrane is a woven or knitted fabric prepared from yarns or single strands of phenolic fibers.

The figure is a schematic diagram of a fuel cell in section.

Referring to the diagram, the fuel cell has a case or vessel 1. Within the case are inserted two porous electrodes, a positive electrode 3 and a negative electrode 2. The electrodes enclose an inner space which contains the electrolyte 6. Means 4 are provided for introducing reducing gases behind the negative electrode and means 5 are also provided for introducing oxidizing gases behind the positive electrode. A phenolic fiber membrane 9 divides the inner space and is substantially parallel to the porous electrodes. Occasional bubbles of oxidizing gas 8 and fuel 7 enter the electrolyte. Where the fuel cell is big enough and the inner space contains sufficient electrolyte separating the electrodes, these bubbles simply surface and escape through vents without reacting and thereby causing overheating of the fuel cell. In cells according to this invention, the inner space can be narrowed substantially and the amount of electrolyte reduced because the porous membrane prevents communication of bubbles of reducing gas or oxidizing gas across the membrane.

It is an essential feature of this invention that the membrane comprise synthetic fibers that are resin condensation products of phenols and aldehydes which can be fiberized and cured. Other organic or synthetic fibers are unsuitable. Most natural or synthetic fibers rapidly lose their strength as they are heated above room temperature or are rapidly dissolved by mineral acids. Until the present invention the only material that worked reasonably well as a membrane for fuel cells was polytetrafluoroethylene. While this material could withstand the temperatures and acids or alkalies present as the electrolyte, its resistance to wetting by the electrolyte enabled the bubbles of oxidizing gases and fuel to pass through the membrane. Glass fiber membranes, while not softening at operating temperatures, are readily dissolved in concentrated or dilute alkali or in hot phosphoric acid.

Membranes prepared from phenolic fibers do not melt and are resistant to all acids and alkalies with the exception of nitric acid which is not used in fuel cells. It is easily wet by electrolytes either alkaline or acid and, therefore, is an effective barrier against gas bubbles.

Phenolic resins are prepared by a condensation reaction between phenols and aldehydes. The common reactants are phenol, itself, and formaldehyde. The various phenols and aldehydes that can be used are well known. See for example, Phenolic Resins by D. F. Gould, Reinhold Publishing Company, New York (1959). The condensation reaction proceeds very slowly in the absence of a catalyst. When alkaline catalysts are used, and the molar ratio of formaldehyde to phenol is greater than 1:1, the primary reaction products are phenol alcohols which are called resoles. When acid catalysts are used and the molar ratio of formaldehyde to phenol is less than 1:1, the primary reaction products are probably also phenol alcohols but they rearrange rapidly to yield diphenyl methane derivatives to which the name novolac has been given. Resoles are thermal setting, whereas novolacs are permanently fusible. However, novolacs can be cured by treatment with aldehydes or hexamethylene tetramine, among others, in the presence of appropriate catalysts. The fundamental difference between resoles and novolacs is the presence of one or more free methylol groups on the former; it is through reaction of these methylol groups that crosslinking occurs.

Phenolic fibers can be made from resoles and novolacs or combinations of each in varying proportions. Additives and modifiers, either reactive or nonreactive, can be used to alter the fiber characteristics either for attenuation or end use properties. When resoles are used as a starting material they should be dried prior to fiberization. Fibers may be drawn from a viscous mass or may be formed by forcing the viscous mass into a turbulent air stream. The resole fibres are cured by heating. Novolacs may be fiberized in a similar manner. When a pure novolac is fiberized, curing is accomplished as already described. Fibers can be made from a novolac according to the process described in U.S. patent application Ser. No. 710,292, filed Mar. 4, 1968, by Economy and Clark, entitled "Fibers from Novolacs and Method for Their Production." That application and this application are assigned to a common assignee.

Fabrics may be woven or knitted from continuous strands of phenolic fibers or may be woven or knitted from yarns which are prepared from phenolic fiber staples. Staples are made into yarn by the common textile-making practices of opening, picking, breaker drawing, finisher drawing, carding, roving and spinning. Worsted systems may also be used. Phenolic fiber paper can be manufactured from short fibers approximately 1/16 to 1/4 inch long by any typical paper-making process. The fibers may either be bonded by the use of resins such as phenolic resins or may be self-bonded.

Phenolic fiber membranes are resistant to attack from dilute and concentrated nonoxidizing acids at room temperature and at elevated temperatures when exposed for extended periods of time. The changes of weight, color and appearance of fibers immersed for a period of 168 hours in sulphuric and phosphoric acids are given in the following table.

TABLE I

[Acid resistance of phenolic fibers with diameters of 14–30 microns, 168 hours exposure]

| Acid | Percent | Room temperature, change of— | | Elevated temperature, change of— | | |
|---|---|---|---|---|---|---|
| | | Wt. (percent) | Appearance | Temperature° C., | Wt. (percent) | Appearance |
| H$_2$SO$_4$ | 10 | 4.29 | None | Reflux | 10.88 | Red brown. |
| H$_2$SO$_4$ | 70 | 4.63 | None | 160 | 23.3 | Black. |
| H$_3$PO$_4$ | 85 | −0.5 | None | {100 / 150} | −2.5 / −2.5 | None. / Do. |

Phenolic fiber filters are resistant to attack from dilute alkalies at room temperature and under reflux conditions. Changes of weight and appearance of phenolic fibers immersed in a 10% solution of sodium hydroxide are listed in the following table.

TABLE II

Resistance to alkalies, 14–30 microns diameter phenolic fibers, 168 hours exposure Room temp.:
  Alkali _____ NaOH.
  Percent _____ 10.
  Change of—
    Weight (percent) _____ 16.29.
    Appearance _____ Slightly brittle, purple.
Elevated temp.:
  Change of—
    Temp. _____ Reflux.
    Weight (percent) _____ 3.34.
    Appearance _____ Some brittleness.

The weight changes shown in Tables I and II were determined after washing the fibers with water and subsequently drying at room temperature for six hours.

A fuel cell experiment was simulated to test the stability of a phenolic fiber membrane versus a glass fiber membrane in 85% phosphoric acid. In carrying out the experiment, a phenolic fiber membrane and an E-glass fiber membrane were separately suspended in 85% phosphoric acid held at 140° C., and oxygen was bubbled in at the rate of 0.5 cc. per second in such a way as to impinge on the membranes. Within 15 hours the glass membrane had completely disintegrated, whereas the phenolic fiber membrane was still intact after 168 hours.

Applicant's invention provides a new fuel cell construction which is relatively narrow compared to prior art fuel cells. This is extremely advantageous because many fuel cells must be connected in series in order to provide adequate voltages for most purposes.

Having thus described my invention in detail and with the particularity required by the patent statutes what is desired to have protected by Letters Patent is as follows.

I claim:

1. In a fuel cell comprising a case, positive and negative porous electrodes inserted within the case and enclosing an inner space, electrolyte within said inner space, means for introducing an oxidant gas through one porous electrode and a fuel through the other, the improvement comprising having the inner space divided by a porous membrane consisting essentially of cured phenolic fibers prepared from the resin condensation products of phenols and aldehydes which can be fiberized and cured.

2. A fuel cell according to claim 1 in which the porous membrane is a paper prepared from phenolic fibers.

3. A fuel cell according to claim 1 in which the porous membrane is a fabric prepared from phenolic fibers.

4. A fuel cell according to claim 2 in which the paper is self-bonded.

5. A fuel cell according to claim 2 in which the paper is phenolic resin-bonded.

References Cited

UNITED STATES PATENTS

| | | | |
|---|---|---|---|
| 2,430,868 | 11/1947 | Francis | 136—146UX |
| 3,350,294 | 10/1967 | Hall et al. | 136—86X |
| 3,403,055 | 9/1968 | Weiss et al. | 136—86 |
| 3,418,169 | 12/1968 | Matsen et al. | 136—86 |

WINSTON A. DOUGLAS, Primary Examiner

D. L. WALTON, Assistant Examiner

U.S. Cl. X.R.

136—146